A. & T. BEUCUS.
CAR COUPLING.

No. 104,543.                               Patented June 21, 1870.

Witnesses:
L. Hailer
Phil. T. Dodge

Inventors
A. Beucus
T. Beucus
by Dodge & Munn
their attys

United States Patent Office.

ABRAHAM BEUCUS AND TENNES BEUCUS, OF WAUPUN, WISCONSIN.

Letters Patent No. 104,543, dated June 21, 1870.

IMPROVEMENT IN CAR-COUPLING.

The Schedule referred to in these Letters Patent and making part of the same.

*To all whom it may concern:*

Be it known that we, ABRAHAM BEUCUS and TENNES BEUCUS, of Waupun, in the county of Fond du Lac and State of Wisconsin, have invented certain Improvements in Car-Couplings, of which the following is a specification, reference being had to the accompanying drawing.

Our invention relates to car-couplings, and consists in the novel construction and arrangement of certain mechanical devices for coupling cars, either with an arrow-headed rotating coupling-bolt, or by the ordinary coupling-link, as hereinafter explained.

In the drawing—

Figures 1, 2, 3, 4, 5:
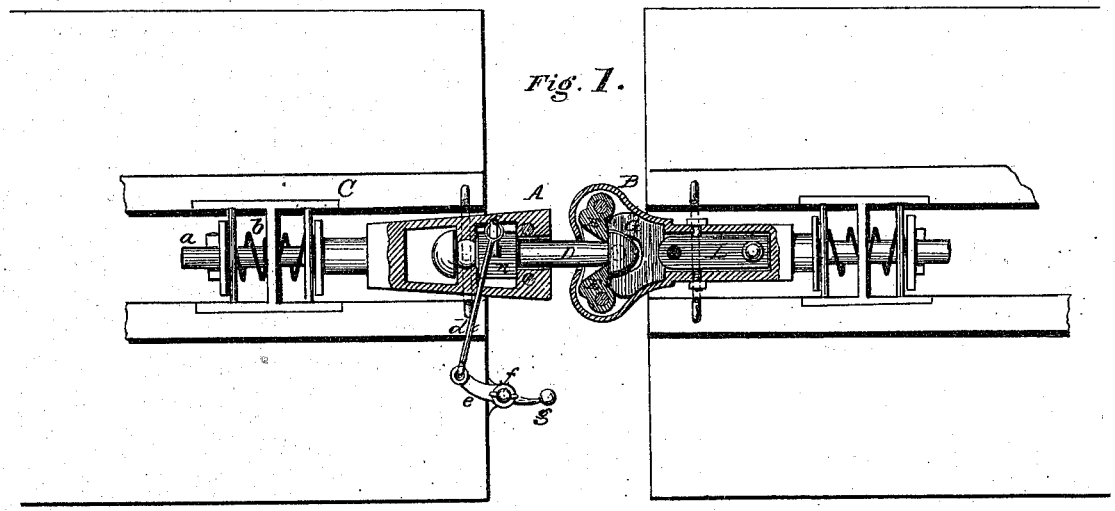
Figure 1 is a plan view of our devices, partly in section, looking against them from the under side, as attached to and coupling the cars.
Figure 2 is a top plan view of a part detached.
Figure 3 is a longitudinal vertical section of the draw-heads and coupling-link detached from the cars.
Figure 4 is a longitudinal section on the line $y\ y$ of fig. 5.
Figure 5 is a longitudinal section on the line $x\ x$ of fig. 4.

In constructing our coupling devices, we make two draw-heads, A and B, provided with shanks $a$ and spiral springs $b$, for holding them in position, and arrange them under the ends of adjoining cars, as shown in fig. 1.

In the chambered end of the draw-head A is mounted an arrow-headed coupling-bolt, D, arranged so as to turn loosely in its bearings, and constructed with a projection or enlargement, $n$, so that it may have no longitudinal motion, and yet may have a strong longitudinal bearing, as clearly shown in figs. 1 and 3.

This bolt D is provided with a short arm, $c$, projecting from its enlargement $n$, and at right angles with its length, and this arm $c$ is connected loosely to a horizontal rod, $d$, which in turn is in like manner connected to an arm, $e$, attached rigidly and at right angles to a vertical rod, $f$, which extends above the roof of the car, where it is provided with a handle, $g$, for operating it, as shown in fig. 1.

The vertical rod $f$ passes through eyes on the end of the car, and has a shoulder on it near the lower eye, for supporting it. The upper eye $h$, through which it passes, is provided with a rim or flange, projecting from its upper edge, which is provided with notches $i$, into which a pin, $j$, attached to and projecting from the rod $f$, may catch when desired, as shown in fig. 2, so as to hold the rod $f$, and consequently its attachments, in any position desired.

In the end of the draw-head B are pivoted a pair of jaws, E, which have their free ends held forward by a rubber spring, G, placed in the lower part of the draw-head for that purpose, as clearly shown in figs. 1 and 3; and, when so pressed forward, are far enough apart to allow the head of the bolt, D, when its parallel sides are vertical, to pass between them, as shown in fig. 3, and then to be turned and lock behind them, as shown in fig. 1, the jaws and the frame of the draw-head being constructed and arranged as shown in the same figure.

Besides these devices, the operation of which will be more fully explained hereafter, we also construct and combine with them certain other devices, by the use of which the ordinary coupling-link may be used, and thus cars of different heights be coupled.

We make a supplemental head-piece, H, constructed with an outer and inner transverse diaphragm, both slotted or perforated so that it may be placed and fastened upon the arrow-headed coupling-bolt D, by simply passing it upon the end of the bolt, and then turning it half-way round, as clearly shown in figs. 4 and 5. Its front end is provided with a suitable opening for inserting an ordinary coupling-link, I, and also with holes for a locking-bolt, K, as shown in the same figures.

Within the chamber of the draw-head B is placed an inner head, L, constructed and arranged to slide therein, so that it may be used in connection with a coupling-link.

This inner head consists of an upper and lower parallel piece, connected at their rear ends. A strong bolt, $p$, passes between these pieces, and is secured to the draw-head B, which allows the head L to slide forward until its rear end bears against the bolt $p$.

The front ends of this head L are provided with holes for the admission of a locking-bolt, as well as the front end of the draw-head, so that a link of the ordinary kind may be inserted in the end of the draw-head, and be attached or fastened to this inner head L.

This head L is also provided on its under side with a pin, $k$, having shoulders $l$ close to the under side of the head.

This pin $k$ passes though a slot, $m$, having circular ends $s$, of the size of the shoulders $l$, so that, by means of this pin, the head L may be moved backward and forward, and fastened in position by means of the shoulder or the pin dropping into the circular openings $s$, there being room enough in the chamber of the draw-head B to raise the head L far enough to disengage the shoulder $l$ of the pin.

The coupling, with the bolt D, may be done positively or automatically. If done automatically, it is only necessary to fasten the bolt D so that the flat sides of its head will be horizontal; then, as the cars come together, the head will press the jaws E apart, till it passes them, when they will be driven forward by the rubber spring G, and the coupling will be complete.

If it is desired not to have the cars couple when they come together, the bolt-head may be locked or fastened in the proper position to secure this result.

By means of the handle $g$, vertical rod $f$, and arms $e$ and $c$, with their connecting-rod $d$, it will be seen that the bolt D may be turned in any direction desired, and, by means of the pin $j$ and notches $i$ in the eye $h$, may be locked in any position required.

Whenever it is desired, because of the different heights of the cars, or for any other reason, to use the ordinary coupling-link instead of the bolt, it is only necessary to attach the supplemental coupling head-piece H to the end of the bolt, and bring forward the inner head-piece L, and couple by inserting and fastening them, as above described.

In this way we construct and arrange a series of mechanical devices for coupling cars either with a bolt or an ordinary coupling-link.

We are aware that the rotating coupling-rod D is not new, and therefore we do not claim that; but having thus described our invention,

What we claim is—

1. The combination of the vertical rod $f$, provided with a suitable locking device, and the rotating coupling-rod D, when said parts are connected by the arms $c$ and $e$, and link $d$, all arranged as herein described.

2. The rod $f$, provided with the pin $j$, in combination with the notched plate $h$, for locking the coupling in position, as set forth.

3. The supplemental head H, constructed as herein described, so as to be attached to or removed from the end of the coupling bolt D, substantially as and for the purpose set forth.

4. In combination with a chambered draw-head, provided with fixed bolt $p$ and slot $s$, the inner sliding head L, having a shouldered pin, $k$, attached, constructed substantially as herein described, and for the purpose set forth.

ABRAHAM BEUCUS.
TENNES BEUCUS.

Witnesses:
W. H. TAYLOR,
JOHN LANDAAL.